(12) United States Patent
Le Cadet et al.

(10) Patent No.: US 11,273,926 B2
(45) Date of Patent: Mar. 15, 2022

(54) EN ROUTE FLUID TRANSMITTING APPARATUS

(71) Applicant: AIRBUS HELICOPTERS DEUTSCHLAND GMBH, Donauworth (DE)

(72) Inventors: Yann Le Cadet, Westendorf (DE); Samuel Pellerin, Donauworth (DE)

(73) Assignee: AIRBUS HELICOPTERS DEUTSCHLAND GMBH, Donauworth (DE)

( * ) Notice: Subject to any disclaimer, the term of this patent is extended or adjusted under 35 U.S.C. 154(b) by 371 days.

(21) Appl. No.: 16/686,615

(22) Filed: Nov. 18, 2019

(65) Prior Publication Data
US 2020/0239154 A1 Jul. 30, 2020

(30) Foreign Application Priority Data
Jan. 24, 2019 (EP) .................................... 19400003

(51) Int. Cl.
| | |
|---|---|
| *B64D 39/00* | (2006.01) |
| *B64D 39/02* | (2006.01) |
| *B64C 39/02* | (2006.01) |
| *B64D 39/04* | (2006.01) |
| *B64D 47/00* | (2006.01) |

(Continued)

(52) U.S. Cl.
CPC ............ *B64D 39/02* (2013.01); *B64C 39/022* (2013.01); *B64D 39/04* (2013.01); *B64D 47/00* (2013.01); *B60S 5/02* (2013.01); *B64C 2201/027* (2013.01); *B64C 2201/042* (2013.01); *B64C 2201/12* (2013.01); *B64C 2201/141* (2013.01); *B64F 1/28* (2013.01)

(58) Field of Classification Search
CPC .... B64D 39/02; B64D 39/00; B64C 2201/141
See application file for complete search history.

(56) References Cited

U.S. PATENT DOCUMENTS

| | | | |
|---|---|---|---|
| 6,604,711 | B1 | 8/2003 | Stevens et al. |
| 6,966,525 | B1 | 11/2005 | Schroeder |

(Continued)

FOREIGN PATENT DOCUMENTS

| | | |
|---|---|---|
| EP | 1753659 A2 | 2/2007 |
| EP | 1761432 A1 | 3/2007 |

(Continued)

OTHER PUBLICATIONS

European Search Report for European Application No. EP 19400003. 0, Completed by the European Patent Office, dated Jul. 19, 2019, 6 pages.

*Primary Examiner* — Brian M O'Hara
(74) *Attorney, Agent, or Firm* — Brooks Kushman P.C.

(57) ABSTRACT

An en route fluid transmitting apparatus for transmitting a fluid from a transmitting entity to a probe of a receiving vehicle includes a funnel, a hose and a thrust producing device. Thrust producing device includes a main body that is rigidly attached to the funnel, and at least two rotors that are connected to the main body for producing thrust. The thrust producing device is adapted to move the funnel freely in any direction to a predetermined position relative to the probe where the funnel engages with the probe.

15 Claims, 5 Drawing Sheets

(51) Int. Cl.
  *B60S 5/02*      (2006.01)
  *B64F 1/28*      (2006.01)

(56) References Cited

U.S. PATENT DOCUMENTS

| | | | | |
|---|---|---|---|---|
| 8,540,183 B2 * | 9/2013 | Morris | ............... | B64D 39/00 |
| | | | | 244/1 TD |
| 10,137,998 B2 * | 11/2018 | Margetis | ............... | B63B 27/34 |
| 2011/0226905 A1 | 9/2011 | Kirkland et al. | | |

FOREIGN PATENT DOCUMENTS

| | | | | | |
|---|---|---|---|---|---|
| EP | 1789321 | A1 | | 5/2007 | |
| EP | 2474475 | A2 | | 7/2012 | |
| EP | 2759478 | A1 | | 7/2014 | |
| GB | 2129382 | A | * | 5/1984 | ............ B64D 39/00 |
| GB | 2418186 | A | | 3/2006 | |
| GB | 2536352 | A | | 9/2016 | |
| WO | 2006073468 | A1 | | 7/2006 | |
| WO | 2006091217 | A1 | | 8/2006 | |
| WO | 2006137827 | A1 | | 12/2006 | |

\* cited by examiner

EN ROUTE FLUID TRANSMITTING APPARATUS

CROSS-REFERENCE TO RELATED APPLICATIONS

This application claims priority to European patent application No. EP 19400003.0 filed on Jan. 24, 2019, the disclosure of which is incorporated in its entirety by reference herein.

BACKGROUND OF THE INVENTION

(1) Field of the Invention

The present embodiments relate to an en route fluid transmitting apparatus and, more particularly, to an en route fluid transmitting apparatus transmitting a fluid from a transmitting entity to a receiving vehicle.

(2) Description of Related Art

En route refueling is an important method for extending the range of both manned and unmanned vehicles traveling long distances that have no feasible refueling points. En route refueling is a very complex operation, both for a tanker and a receiving vehicle, and many parameters may disturb the positioning of the tanker and the receiving vehicles relative to each other, such as speed, swirls, clouds, etc. Furthermore, the extremely narrow tolerance allowed in this operation makes it quite delicate.

For example, in-flight refueling is an effective method of increasing the range of aircrafts by refueling them in flight. Refueling is usually carried out by a tanker aircraft which is provided with a connecting device that includes a hose or the like that is connected to at least one reservoir within the tanker, and which, after connection with the connecting device of a receiving aircraft, ensures the transfer of fuel from the tanker to the tank of the receiving aircraft.

In-flight refueling is a relatively common operation, especially for military aircrafts. However, the passage of large amounts of fuel between the tanker aircraft and the receiving aircraft during an in-flight refueling operation may create a potentially dangerous situation. There may be forces on the components of the in-flight refueling system that are generated by a drag between transmitting and receiving aircrafts during transfer of the fuel. These force components in an in-flight refueling system may move or oscillate in an uncontrolled manner.

Document EP 1 789 321 A1 describes an in-flight refueling system, a sensor system and a method that are provided for detecting and damping changes in the disposition of an elongate hose extending from a tanker aircraft during an in-flight refueling operation. The various embodiments of the invention provide a compact, lightweight, and low-profile sensor device that may be fitted to the elongate hose so as to detect oscillations in the elongate hose and transmit a signal to a hose retracting device carried by the tanker aircraft such that the hose retracting device retracts the elongate hose in response to the signal so as to counteract the occurrence of oscillations within the elongate hose. Thus, these embodiments may minimize the effect of oscillations in the elongate hose by selectively retracting the elongate hose in response to oscillations detected therein as it extends from the tanker aircraft during an in-flight refueling operation.

Document GB 2 418 186 describes a refueling drogue that is provided with an active control system. The system may regulate the position of the drogue relative to a refueling aircraft, and may comprise a control computer, which may be located in the refueling aircraft, or on the drogue, and may control actuators which drive movable portions of control surfaces. Various arrangements of control surfaces are disclosed. To enable control at any angle of rotation of the drogue, a gravity vector sensor, gyroscope, or shaft encoder may be used. The control system may utilize measurements of angles between an axis through the center of a refueling hose (to which the drogue is connected) and a reference axis such as the direction of gravity and/or the direction of airflow. Sensors may be used for this purpose. An autonomous docking system may also be provided to facilitate engagement between the drogue and a probe on a receiving aircraft, such as an unpiloted aerial vehicle. The docking system may utilise optical or microwave radiation emitters/receivers. The drogue may also be stabilized by means of a rotatable mass and details of various such arrangements are disclosed.

Document EP 1 761 432 A1 describes an in-flight refueling system, an alignment system, and a method that are provided for substantially automating the positioning and engagement of an in-flight refueling system carried by a first aircraft with respect to a refueling receptacle carried by a second aircraft so as to facilitate an in-flight refueling operation between the first and the second aircraft. More specifically, the present invention provides for the alignment of the in-flight refueling boom with the refueling receptacle such that an extendable nozzle may extend from the in-flight refueling boom, and engage the refueling receptacle to initiate an in-flight refueling operation.

Document EP 2 759 478 A1 describes a Wireless Communication and Sensor System (WSCC) serving a refueled entity and a refueling entity, the system comprising a nozzle load sensing functionality for a nozzle Boom Tip Unit; and an apparatus for wirelessly transmitting loads sensed by the nozzle load sensing functionality to at least one of a boom operator and a boom flight control computer.

Document EP 1 753659 A2 describes a refueling drogue that is adapted to connect to a refueling hose extending from a refueling aircraft. The drogue may include an active stabilization system adapted to effectively stabilize the refueling drogue via control surfaces on the refueling drogue when the refueling drogue is placed in an airstream.

Document US 2011/0226905 A1 describes a stabilized controllable drogue for an inflight aerial refueling system that includes a reception coupling, a paradrogue frame, a drogue canopy, and a plurality of actuators for moving the drogue canopy in a desired direction to control, steer and stabilize the stabilized controllable drogue during turbulent conditions.

Document EP 2 474 475 A2 describes a refueling drogue coupling system. The system includes a fluid passage extending from a coupling inlet to a coupling outlet, the fluid passage comprising a valve seat circumscribing the fluid passage proximate the coupling outlet, a valve plug assembly comprising a valve plug configured to engage the seat to prevent flow through the fluid passage, and an actuator assembly comprising a bias member, a coupling latch assembly coupled to the coupling outlet, the coupling latch assembly comprising a latch member configured to matingly engage a complementary latch-receiving member of a receiving probe, the coupling latch assembly further comprising a latch member actuator operatively coupled to the latch member to permit the latch member to move from a first locked position to a second unlocked position, a probe position sensor configured to detect a position of the receiving probe, a hose tension sensor configured to measure a tension in a hose coupled to the coupling inlet, and a drogue control, system positioned on the refueling drogue coupling system, and communicatively coupled to the latch member actuator, the probe position sensor, and the hose tension sensor.

However, most of the current solutions provide a hose-and-drogue system that requires a flexible hose having an end attached to a drogue in the tanker aircraft, and a probe to be engaged in the receiving aircraft. The drogue is a funnel-shaped device provided with an aerial refueling coupling, usually fitted with vanes and a canopy at its free end to stabilize its flight once the hose has been deployed from the tanker aircraft for refueling.

The drogue arranges for stabilizing and moving the hose in an airstream. The airstream is created by pulling the hose and drogue with the tanker, and it is mandatory for all "drogue and probe" known systems to work.

In other words, conventional drogues require an airstream through the drogue and can adapt within limits to that airstream using different methods. This implies that conventional drogues cannot actively move against the airstream or against gravity and that the tanker needs to provide that airstream to the drogue. Thus, the tanker itself is often pulling the drogue through the air, thereby generating the airstream that the drogue requires to operate.

Furthermore, the receiving aircraft is often required to adapt, its position for a connection between the probe and the hose. Moreover, most of the solutions allow the system to operate only behind (i.e., airstream relation between drogue and probe) or under the tanker aircraft (gravity relation between drogue and probe).

Document U.S. Pat. No. 6,604,711 B1 describes an autonomous system for the aerial refueling or decontamination of unmanned airborne vehicles. The autonomous system comprises a motor with a variable speed controller that is used to operate a hose reel for connecting a fuel source or decontaminant on a tanker plane to a fuel tank or other receptor on an unmanned vehicle. The hose reel is controlled to feed the fuel or other liquid through the hose and a drogue to a receiving probe on the unmanned vehicle and is also controlled to maintain the drogue in proper position. The drogue is provided with a paradrogue having a base assembly to which ring headers are attached. Thrust nozzles are mounted on the ring headers in order to provide controlled thrust in response to a control signal from an associated drogue motion control for controlling the proper position of the drogue.

BRIEF SUMMARY OF THE INVENTION

Based on the limitations and drawbacks of the prior art, an objective is to provide an en route fluid transmitting apparatus for transmitting a fluid from a transmitting entity to a probe of a receiving vehicle. The en route fluid transmitting apparatus should be able to change its position relative to the probe. The en route fluid transmitting apparatus should be able to stabilize a hose that is used for transmitting the fluid under high turbulences. The en route fluid transmitting apparatus should also be an active system that can be controlled independently of airstream or gravity. Furthermore, the en route fluid transmitting apparatus should be usable when the tanker is a slow vehicle or an immobile structure. Moreover, the en route fluid transmitting apparatus should be able to move into any position relative to the transmitting entity and/or the probe as permitted by the length of the hose to which it is attached.

This objective is solved by an apparatus comprising the features of claim 1.

More specifically, an en route fluid transmitting apparatus for transmitting a fluid from a transmitting entity to a probe of a receiving vehicle comprises a funnel, a hose, and a thrust producing device. The funnel is adapted to engage with the probe. The hose comprises a first end that is attached to the transmitting entity, and a second end, that is attached to the funnel. The hose is adapted to convey the fluid from the transmitting entity to the funnel. The thrust producing device comprises a main body that is rigidly attached to the funnel, and at least two rotors that are connected to the main body for producing thrust. The thrust producing device is adapted to move the funnel freely in any direction to a predetermined position relative to the probe where the funnel engages with the probe.

According to some embodiments, the en route fluid transmitting apparatus may have a drone-like design.

According co some embodiments, the en route fluid transmitting apparatus may be adapted to move freely in any direction.

According to some embodiments, the en route fluid transmitting apparatus may allow to bring the funnel directly to the probe of the transmitting entity.

According to some embodiments, the receiving vehicle may place itself in an area with low disturbances since the en route fluid transmitting apparatus moves freely in any direction.

According to some embodiments, the thrust producing device may be controlled via one or more vision-based sensors.

According to some embodiments, no canopy is required as the stabilization is ensured by the drone, thereby limiting the drag to the funnel.

According to some embodiments, the thrust producing device may insure a stabilization for the hose.

According to some embodiments, the en route fluid transmitting apparatus may provide an active system.

According to some embodiments, the en route fluid transmitting apparatus may be remotely or independently controlled.

According to some embodiments, the en route fluid transmitting apparatus may lead the drogue to the required position where the probe is located.

According to some embodiments, the receiving vehicle may park in an area with low or no disturbances.

According to some embodiments, the drone and the probe may communicate with each other so that the drone finds the correct path to the predetermined position.

According to some embodiments, having more than one en route fluid transmitting apparatus connected, to a transmitting entity may allow to refill more than one receiving vehicle at the same time. For example, a first receiving vehicle may be positioned above the transmitting entity, and a second receiving vehicle may be positioned below the transmitting entity. If desired, additional receiving vehicles may be positioned to the right, the left, the upper right, the upper left, etc. of the transmitting entity.

According to some embodiments, the en route fluid transmitting apparatus may allow the hose to connect with the probe of the receiving vehicle with the current connecting apparatus.

According to one aspect, the thrust producing device comprises a control system that communicates with the probe, and directs the thrust producing device to move the funnel to the predetermined position relative to the probe.

According to one aspect, the control system controls the thrust producing device to maintain the funnel in the predetermined position relative to the probe for a predetermined period of time.

According to one aspect, the control system comprises a machine vision device that is adapted to identify a trajectory from a current position of the funnel to the predetermined position relative to the probe.

According to one aspect, the control system comprises a signal receiving component that is adapted to receive commands from a remote control.

According to one aspect, the funnel comprises an emergency stabilizing device that is adapted to stabilize the hose in the air.

According to one aspect, the emergency stabilizing device comprises at least one of a parachute-type mechanism or an emergency canopy.

According to one aspect, the emergency stabilizing device is deployed in response to a failure of the thrust producing device.

According to one aspect, the thrust producing device comprises at least two air ducts that each accommodate one of the at least two rotors, wherein the at least two air ducts with the at least two rotors are configured to provide a thrust in direction to the predetermined position relative to the probe.

According to one aspect, the thrust producing device is controlled independently of gravity and airstream.

According to one aspect, each of the at least two rotors comprises a rotor hub and at least two rotor blades that are attached to the rotor hub.

According to one aspect, the thrust producing device comprises an electric motor that drives the at least two rotor blades via the rotor hub, and a battery that is located in the main body of the thrust producing device, and that supplies electricity to the electric motor.

According to one aspect, the thrust producing device comprises an electric motor that drives the at least two rotor blades via the rotor hub, and a power harness that is coupled to the hose, and connects a power source onboard the transmitting entity with the electric motor.

According to one aspect, the at least two rotors generate a velocity that is greater than a velocity of the transmitting entity.

According to one aspect, the transmitting entity comprises at least one of a mobile entity or an immobile entity, wherein the immobile entity comprises at least one of a land-based construction, and the mobile entity comprises at least one of a land vehicle, a watercraft, a floating platform, or an aircraft.

Furthermore, a method for operating an en route fluid transmitting apparatus that is adapted to transmit a fluid from a transmitting entity to a probe of a receiving vehicle, wherein the en route fluid transmitting apparatus comprises a funnel, a hose, and a thrust producing device, may include the operations of releasing the thrust producing device with the funnel from the transmitting entity, using a control system of the thrust producing device to communicate with the probe, using the control system of the thrust producing device to actuate rotors of the thrust producing device to move the funnel to a predetermined position relative to the probe, receiving the probe with the funnel, and connecting the funnel with the probe.

BRIEF DESCRIPTION OF THE DRAWINGS

Embodiments are outlined by way of example in the following description with reference to the attached drawings. In these attached drawings, identical or identically functioning components and elements are labeled with identical reference numbers and characters and are, consequently, only described once in the following description.

DETAILED DESCRIPTION OF THE INVENTION

Exemplary embodiments of en route fluid transmitting apparatus may be used to transmit any fluid between any transmitting entity and any receiving vehicle that is in need of a fluid transmission. Examples of transmitting entities may include mobile entities such as land vehicles including cars, buses, or trucks, watercrafts including ships or boats, floating platforms including oil rigs, or aircrafts including airplanes, quadcopters, helicopters, drones, etc., or immobile entities such as land-based constructions including industrial machines and bulk liquid storage structures such as water towers, fuel tanks, etc.

Examples of receiving vehicles may include land vehicles such as cars, buses, or trucks, watercrafts such as ships or boats, or aircrafts such as airplanes, quadcopters, helicopters, drones, etc. Examples of fluids that are transmitted between a transmitting entity and a receiving vehicle may include fuels such as kerosene, gasoline, diesel, liquid gas, etc., water or a water-based solution, liquid flame retardant, etc.

Figure 1:
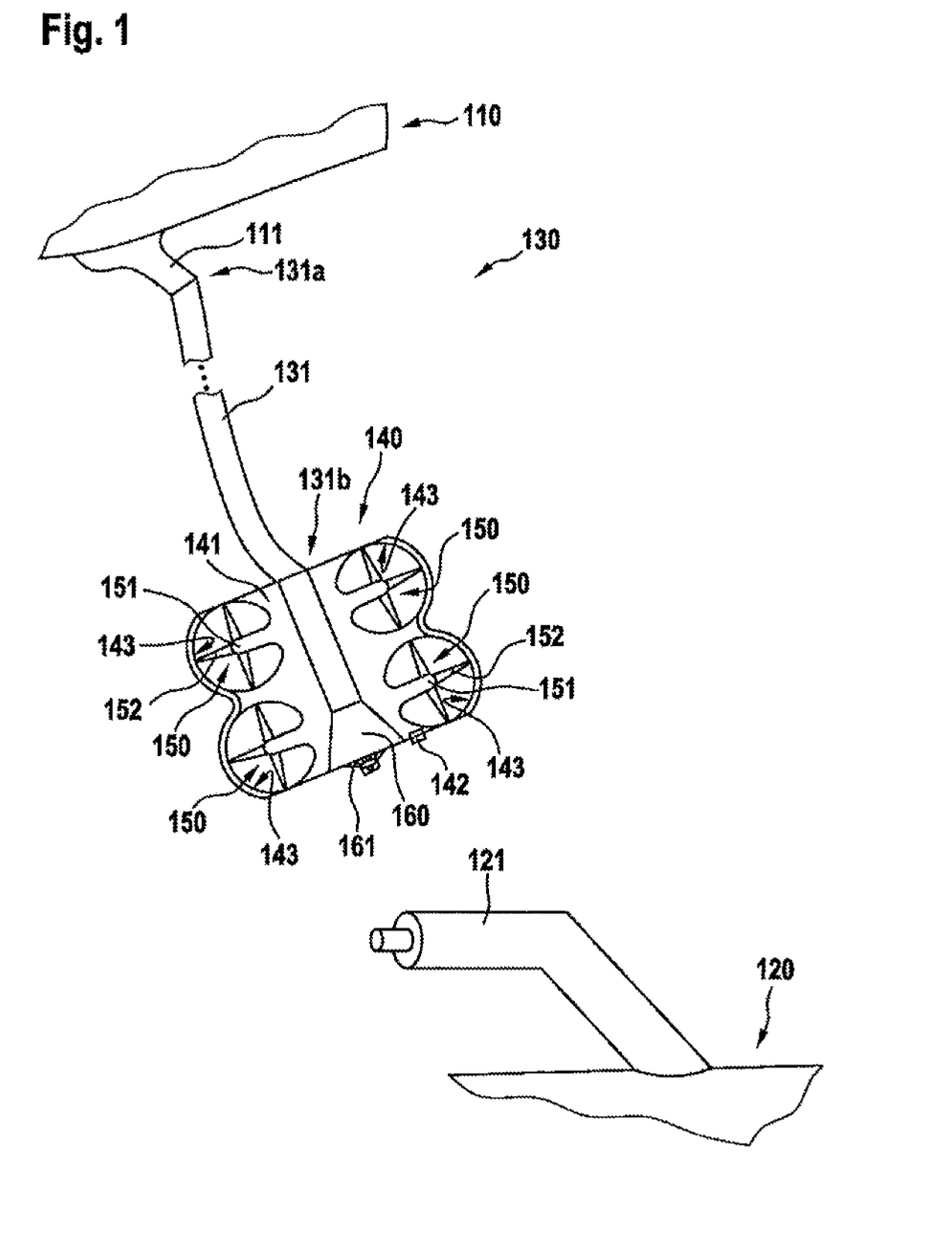
FIG. 1 is a diagram of an illustrative en route fluid transmitting apparatus that, is connected to a transmitting entity and deployed towards a receiving vehicle in accordance with some embodiments.

FIG. 1 shows an illustrative en route fluid transmitting apparatus 130 that is connected to boom 111 of transmitting entity 110. En route fluid transmitting apparatus 130 may transmit a fluid from transmitting entity 110 to probe 121 of receiving vehicle 120.

As shown, en route fluid transmitting apparatus 130 may include funnel 160, hose 131, and thrust producing device 140. Funnel 160 that engages with probe 121 may include emergency stabilizing device 161. Hose 131 may be adapted to convey the fluid from the transmitting entity 110 to funnel 160 and include two ends 131a, 131b. End 131a may be attached to transmitting entity 110. End 131b may be attached to funnel 160.

Thrust producing device 140 may include main body 141 and rotors 150. If desired, thrust producing device 140 may include air ducts 143 and control system 142.

As shown, main body 141 may be equipped with four air ducts 143, and may be rigidly attached to funnel 160. Each air duct 143 may accommodate one of four, rotors 150. Each one of rotors 150 may include rotor hub 151 and rotor blades 152 that are attached to rotor hub 151.

For example, en route fluid transmitting apparatus 130 may include thrust producing device 140 that may be implemented by any suitable device that is capable of producing torque and thrust such as a quadcopter, a drone, an unmanned aerial vehicle, and so on. Thrust producing device 140 may allow to transmit the fluid from above transmitting entity 110, from below transmitting entity 110, from besides of transmitting entity 110, from behind transmitting entity 110, or from any combination thereof.

If desired, en route fluid transmitting apparatus 130 may be adapted for transmitting fuel from transmitting entity 110 to a receiving vehicle 120. For example, en route fluid transmitting apparatus 130 may allow receiving vehicle 120 to remain en route longer, extending its range or loiter time on station.

If desired, en route fluid transmitting apparatus 130 may be used for an in-flight refueling operation. Receiving vehicle 120 may be an aircraft that maintains a maximum take-off weight by carrying less fuel. Receiving vehicle 120 may be topped up with additional fuel in the air by en route fluid transmitting apparatus 130 from transmitting entity 110. Such air refueling may allow receiving vehicle 120 to take off with a greater payload which could be weapons, cargo, or personnel.

In some embodiments, en route fluid transmitting apparatus 130 may be adapted for transmitting water, a water-based solution, or a liquid flame retardant from transmitting entity 110 to a receiving vehicle 120. For example, en route fluid transmitting apparatus 130 may allow to refill receiving vehicle 120, which may be a fire truck or a fire-fighting aircraft during fire-fighting operations.

Transmitting entity 110 may be a mobile entity or an immobile entity. Examples of a mobile entity may include a land vehicle, a watercraft, or an aircraft. A land vehicle may be a car, a truck, an autonomous vehicle, etc., a watercraft may be a ship, a submarine, a boat, etc.

Examples of an immobile entity may include a land-based construction such as a bulk liquid storage structure like a water tower, a fuel tank, etc.

In some embodiments, en route fluid transmitting apparatus 130 may include hose 131. Hose 131 may be adapted to convey the fluid from transmitting entity 110 to funnel 160, thereby transmitting a fluid from boom 111 that is rigidly attached to transmitting entity 120 to probe 121 that is rigidly attached to receiving vehicle 120.

If desired, funnel 160 may be attached to thrust producing device 140. Funnel 160 may be adapted to receive probe 121 of receiving vehicle 120. In some embodiments, for example when transmitting entity 110 is a mobile entity, funnel 160 may include emergency stabilizing device 161. For example, in the scenario of a failure of thrust producing device 140, emergency stabilizing device 161 may be deployed for stabilizing funnel 160 in an airstream that is generated by transmitting entity 110.

If desired, end 131a of hose 131 may be attached to a reel onto which hose 131 is wound. The reel may be mounted either within transmitting entity 110 or on boom 111 which is attached to transmitting entity 110.

When hose 131 is deployed, end 131b of hose 131, with its attached funnel 160, may extend behind transmitting entity 110. Depending on the combinations of transmitting entity 110 and receiving vehicle 120, and the specifications of the conditions under which en route fluid transmitting apparatus 130 is used, the length of the hose may change.

For example, in the scenario of using en route fluid transmitting apparatus 130 during an in-flight refueling operation, hose 131 may trail directly aft and below the fuselage of an aircraft that is used as transmitting entity 110, or, in some instances, it may trail directly aft and below boom 111 that may be attached to the aircraft.

When trailing aft and below boom 111, hose 131 may be exposed to high wind speeds as it is trailed behind transmitting aircraft 110. Therefore, hose 131 may experience oscillatory vibrations in response to applied forces.

In order to avoid the problems arising from the exposure to high wind speeds, thrust producing device 140 may control the movement of end 131b of hose 131 and funnel 160.

For controlling the movement of funnel 160, thrust producing device 140 may include control system 142. If desired, control system 142 may communicate with probe 123 of receiving vehicle 120. For example, control system 142 may direct thrust producing device 140 to move funnel 160 to a predetermined position relative to probe 121. Control system 142 may control thrust producing device 140 to maintain funnel 160 in the predetermined position relative to probe 121 for a predetermined period of time.

In some embodiments, control system 142 may include a machine vision device and/or a signal receiving component. As an example, control system 142 may send a signal to probe 121. The signal may reach probe 121 and probe 121 may respond to the signal receiving component. According to the information received with the signal receiving component, control system 142 may identify a trajectory from a current position of funnel 160 to a desired position relative to the position of probe 121.

As another example, the machine vision device may identify probe 121 and generate information concerning the relative position of probe 121 and funnel 160. The machine vision device may identify a trajectory from the current position of funnel 160 to a predetermined position at which funnel 160 may engage with probe 121.

Rotors 150 may generate thrust to move thrust producing device 140 along the trajectory from the current position of funnel 160 to the desired position relative to the position of probe 121. Thrust producing device 140 may move funnel 160 with end 131b independently from airstream or gravity.

In some embodiments, rotors 150 may be located in an associated air duct 143 in order to improve underlying aerodynamics and to increase operational safety of thrust producing device 140. By way of example, four air ducts 143 in FIG. 1 are shown with four separate rotors 150. Each rotor 150 may be structurally connected to main body 141. By way of example, this may be achieved by means of rotor hubs 151.

Each rotor 150 may include a plurality of rotor blades 151 that extend from rotor hub 151. Each rotor blade 152 produces both a thrust and a torque about its center of rotation, as well as a drag force opposite to the direction of flight of thrust producing device 140.

Figure 2:
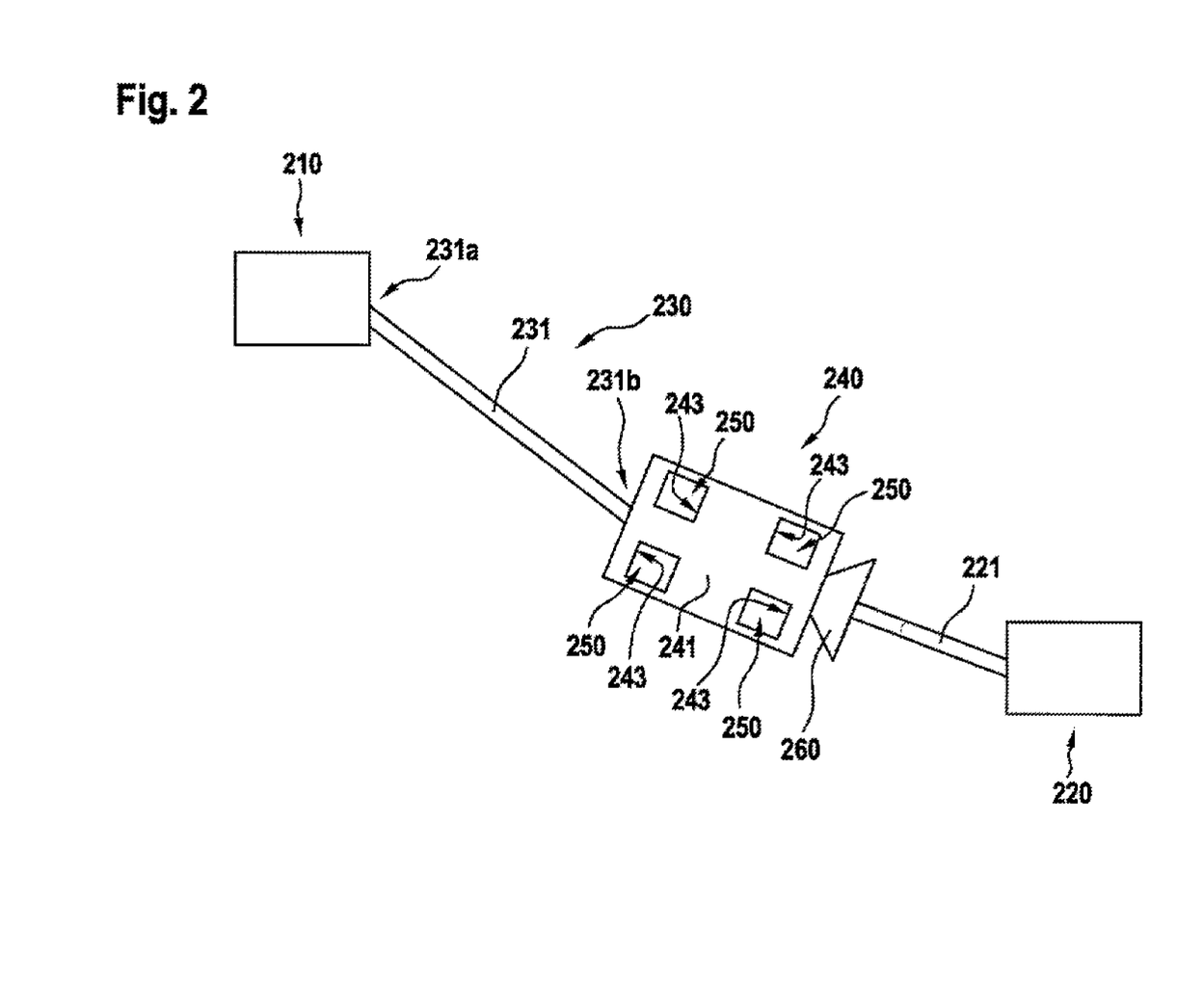
FIG. 2 is a diagram of an illustrative en route fluid transmitting apparatus for transmitting fluid from a transmitting entity to a probe of a receiving vehicle in accordance with some embodiments.

FIG. 2 shows a diagram of an illustrative en route fluid transmitting apparatus 200 that is attached to transmitting entity 210 and coupled with probe 221 of receiving vehicle 220 for transmitting a liquid from transmitting entity 210 to receiving vehicle 220. As shown, en route fluid transmitting apparatus 230 may include funnel 260, hose 233, and thrust producing device 240. Funnel 260 may engage with probe 221. Hose 231 may include two ends 231a, 231b. End 231a may be attached to transmitting entity 210. End 231b may be attached to funnel 260, for example via thrust producing device 240.

Thrust producing device 240 may include main body 241, rotors 250, and air ducts 243. Main body 241 may be rigidly attached to funnel 260. Each air duct 243 may accommodate one of rotors 250.

If desired, rotors 250 may be located in an associated air duct 243 in order to improve underlying aerodynamics and to increase operational safety. As shown, thrust producing device 240 may have four rotors 250 and four air ducts 243. However, thrust producing device 240 may include any number of rotors 250 and/or air ducts 243. For example, thrust producing device 240 may include two, three, four, five, six, etc. rotors 250 and the same or a different number of air ducts. For example, thrust, producing device 240 may have one or more rotors per air duct. If desired, thrust producing device 240 may have two, three, four, etc. rotors per air duct.

In some embodiments, en route fluid transmitting apparatus 230 may be adapted for transmitting fuel from transmitting entity 210 to receiving vehicle 220. For example, en route fluid transmitting apparatus 230 may be used in in-flight refueling operations.

Receiving vehicle 220 may be an aircraft that maintains a maximum of the take-off weight by carrying less fuel. Receiving vehicle 220 may be topped up with additional fuel in the air from transmitting entity 210 by en route fluid transmitting apparatus 230. Such air refueling may allow receiving vehicle 220 to take off with a greater payload which could be weapons, cargo, or personnel.

If desired, end 231a of hose 231 may be attached to a reel onto which hose 231 is wound. The reel may be typically mounted within transmitting entity 210. When hose 231 is deployed, end 231b of hose 231, with its attached funnel 260, may extend from transmitting entity 210. Depending on the combinations of transmitting entity 210 and receiving vehicle 220, and the specifications of conditions under which en route fluid transmitting apparatus 230 is used, the length of hose 231 may change.

If desired, funnel 260 may be attached to thrust producing device 240. Funnel 260 may be adapted to receive probe 221 of receiving vehicle 220. If desired, thrust producing device 240 may include a control system.

The control system may communicate with probe 221. In some embodiments, the control system may direct thrust producing device 240 to move funnel 260 to a predetermined position relative to probe 221. If desired, the control system may control thrust producing device 240 to maintain funnel 260 in the predetermined position relative to probe 221 for a predetermined period of time. Thus, receiving vehicle 220 may move probe 221 into a position in which probe 221 may couple with end 231b of hose 231 via funnel 260.

In some scenarios, during an operation of en route fluid transmitting apparatus 230, hose 231 may be exposed to high forces caused by high winds between transmitting entity 210 and receiving vehicle 220. As a possible result, hose 231 may experience oscillatory vibrations in response to said applied forces.

In order to avoid problems caused by high winds, thrust producing device 240 may control the movement of end 231b of hose 231 and funnel 260.

For example, thrust producing device 240 may be a drone-like device. Thrust producing device 240 may include a plurality of rotors 250. For example, as shown in FIG. 2, thrust producing device 240 may include four, rotors 250. Rotors 250 may produce a thrust within each air duct 243, so that thrust producing device 240 takes a desired movement path or trajectory in air and/or is able to hover in the air as well as to fly in any direction.

Thrust producing device 240 may include one or more engines that are capable of rotating rotor 250 in operation. For example, thrust producing device 240 may include a turbine, a diesel engine, an Otto-motor, an electrical engine, etc.

Thrust producing device 240 may include a power supply which supplies rotors 250 with the required energy or energy form. For example, the power supply may deliver electrical energy. As another example, the power supply may deliver a fuel such as gasoline, kerosene, or diesel.

In some embodiments, thrust producing device 240 may be powered with the energy of a battery that is located in main body 241. The battery may supply electricity to the electric motor. The battery may be implemented by any suitable battery, such as lithium ion batteries (e.g., lithium-polymer (Li—Po) batteries), lead-acid batteries, Nickle Cadmium (NiCad) batteries, Nickle Metal Hybrid (NiMH) batteries, etc.

If desired, thrust producing device 240 may include a fuel tank. The fuel tank onboard thrust producing device 240 may be fueled before an operation.

In some embodiments, a power harness that is coupled to hose 231 may provide electric energy to an electric engine or transmit fuel to an engine. The power harness may connect a power source onboard transmitting entity 210 with the engine onboard thrust producing device 240.

In some embodiments, information about the position of probe 221 may be transmitted to thrust producing device 240. For example, thrust producing device 240 may use signals or specifications of a target position of probe 221 to control rotors 250, such that thrust producing device 240 may move funnel 260 to a predetermined position relative to the position of probe 221.

In some embodiments, thrust producing device 240 may include control system 242 that communicates with probe 221. For example, control system 242 may direct thrust producing device 240 to move funnel 260 to the predetermined position relative to probe 221. If desired, control system 242 may control thrust producing device 240 to maintain funnel 260 in the predetermined position relative to probe 221 for a predetermined period of time.

Control system 242 may include a machine vision device that is adapted to identify a trajectory from a current position of funnel 260 to the predetermined position relative to probe 221.

If desired, control system 242 of thrust producing device 240 may include a signal receiving component that is adapted to receive commands from a remote control. For example, control system 242 may communicate with the probe of the receiving vehicle or another apparatus onboard the receiving vehicle.

Thrust producing device 240 may move end 231b of hose 231 with funnel 260 to a predetermined position relative to probe 221 based on the commands received from the remote control. For example, air ducts 243 with rotors 250 may be configured to provide a thrust in the direction of the predetermined position.

Figure 3:
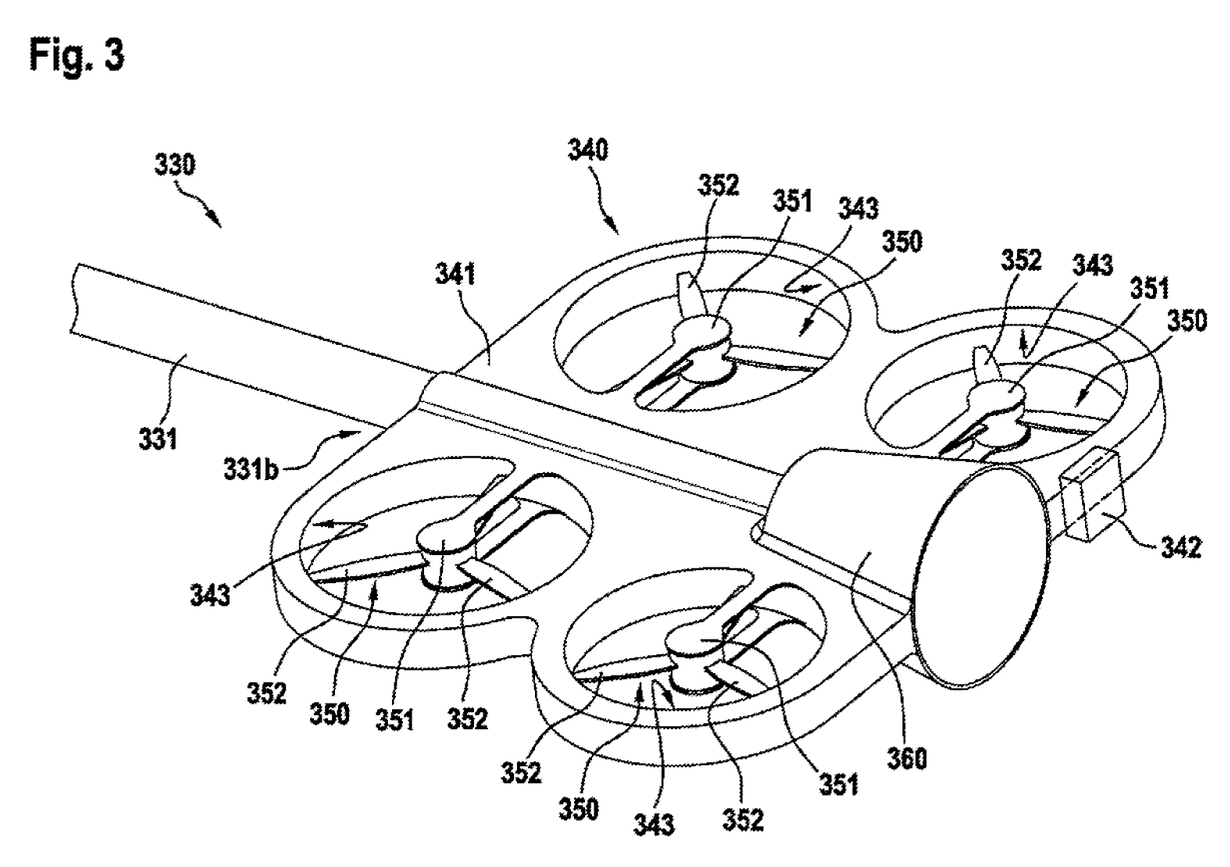
FIG. 3 is a diagram of an en route fluid transmitting apparatus that includes a thrust producing device with four rotors and a funnel in accordance with some embodiments.

FIG. 3 shows illustrative en route fluid transmitting apparatus 330 that includes funnel 360, hose 331, and thrust producing device 340. Hose 331 may include end 331b that is attached to funnel 360.

Thrust producing device 340 may include a main body 341, rotors 350, air ducts 343 and control system 342. Illustratively shown are four rotors 350 and four air ducts 343 in main body 341.

As shown, main body 341 may be rigidly attached to funnel 360. Each air duct 343 may accommodate a rotor 350. Each rotor 350 may include rotor hub 351 and rotor blades 352 that are attached to rotor hub 351.

FIG. 3 shows illustrative thrust producing device 340 with four air ducts 343 each of which is accommodating one rotor 350. If desired, thrust producing device 340 may include any number of air ducts 343 with any number of rotors 350. For example, thrust producing unit 340 may include three air ducts 343 that each include two parallelly arranged rotors 350, or seven air ducts 343 that each include five parallelly arranged rotors 350, just to name a few.

If desired, rotors 350 may be located in an associated air duct 343 in order to improve underlying aerodynamics and to increase operational safety. Air ducts 343 with rotors 350 may be configured to provide a thrust in the direction of the position relative to the position of a probe (e.g., probe 121, 221, 421 of FIG. 1, FIG. 2, or FIG. 4).

In some embodiments, thrust producing device 340 may control the movement of funnel 360. For controlling the movement of funnel 360, thrust producing device 340 may include control system 342. If desired, control system 342 may communicate with the probe (e.g., probe 121, 221, 421 of FIG. 1, FIG. 2 or FIG. 4).

Control system 342 may direct thrust producing device 340 to move funnel 360 to a predetermined position relative to the probe. If desired, control system 342 may control thrust producing device 340 to maintain funnel 360 in the predetermined position relative to the probe for a predetermined period of time. Thrust producing device 340 may be controlled independently of gravity and airstream.

If desired, control system 342 may include a machine vision device and/or a signal receiving component. The machine vision device may send a signal to the probe. In some embodiments, the probe may communicate with control system 342, for example by returning a signal to the signal receiving component.

According to information received with the signal that is received in the signal receiving component, control system 342 may identify a trajectory from a current position of funnel 360 to the predetermined position relative to the position of the probe.

Thrust producing device 340 may include a power supply which supplies rotors 350 with the required energy or energy form. As an example, the power supply may deliver electrical energy. If desired, thrust producing device 340 may include an electrical motor that drives rotors 350. Rotors 350 may produce thrust in operation such that thrust producing device 340 is able to hover in the air and fly in any direction.

In some embodiments, each one of rotors 350 may be structurally connected to main body 341. By way of example, this may be achieved by means of rotor hubs 351. Each rotor 350 may include a plurality of rotor blades 352 that extend from rotor hub 351. Each rotor blade 352 produces both a thrust and a torque about its center of rotation, as well as a drag force opposite to the direction of flight, of thrust producing device 340. All rotor blades 352 may spin at the same angular velocity, the net aerodynamic torque may be zero.

If desired, thrust producing device 340 may be powered or charged with energy before an operation by a power harness. The power harness may be coupled to hose 331. The power harness may connect a power source onboard a transmitting entity (e.g. transmitting entity 110, 210 of FIG. 1 or 2) with the electric motors that drive rotors 350.

For example, thrust producing device 340 may be powered by a battery that is located in main body 341. The battery may supply electricity to one or mere electric motors. The electric motors may drive rotors 350, if desired. The battery may be implemented by any suitable battery, such as lithium-polymer (Li—Po) batteries, Nickle Cadmium (Ni-Cad) batteries, Nickle Metal Hybrid (NiMH) batteries, and so on.

Figure 4:
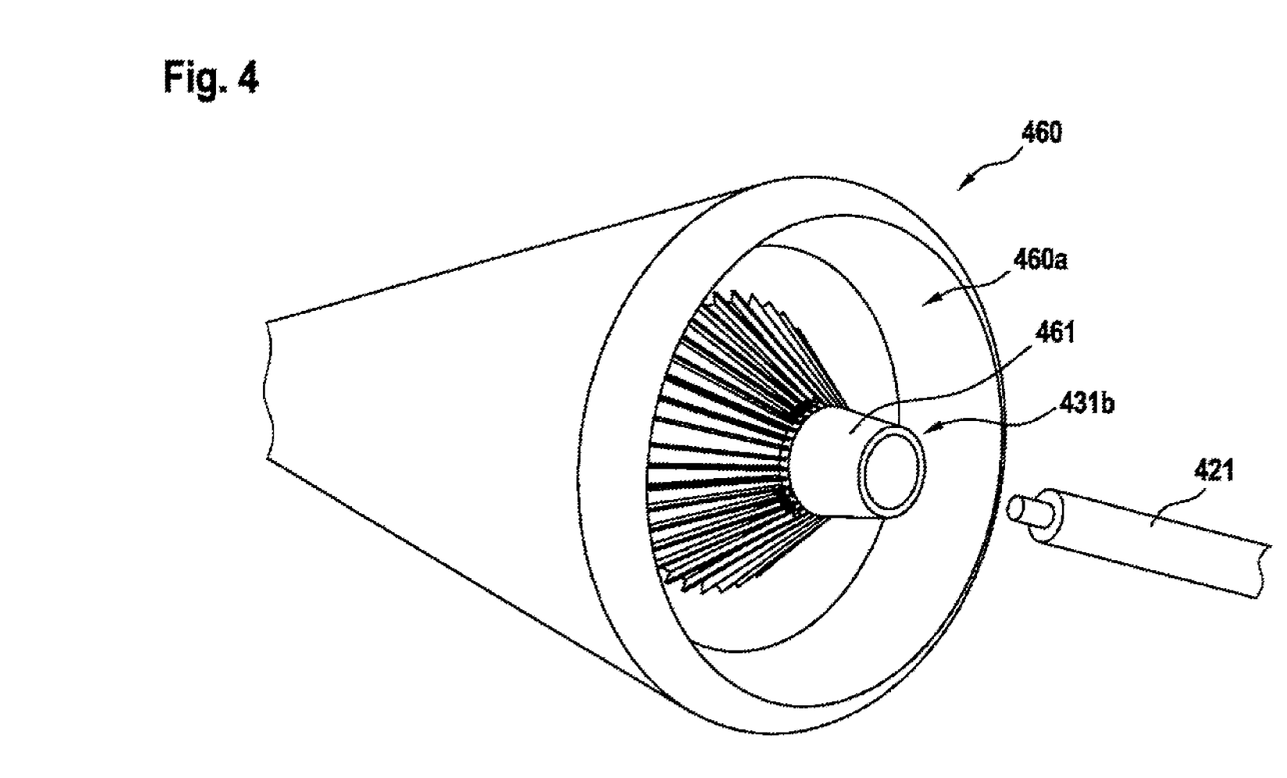
FIG. 4 is a diagram of an illustrative funnel that includes an emergency stabilising device in accordance with some embodiments.

FIG. 4 shows illustrative funnel 460 that includes emergency stabilizing device 461. Emergency stabilizing device 461 may be arranged at inlet region 460a of funnel 460, and may be engaged with end 431b of the hose (e.g., hose 131, 231, 331 of FIG. 1, FIG. 2, or FIG. 3). Emergency stabilizing device 461 with end 431b may be adapted for a connection with probe 421.

As an example, consider the scenario in which the transmitting entity is a moving vehicle such as an aircraft, a land vehicle, or a watercraft. In this scenario, emergency stabilizing device 461 may be at least one of a parachute-type mechanism or an emergency canopy that is adapted to stabilize the hose in the air. The parachute-type mechanism or the emergency canopy may be adapted to connect end 431b of the hose (e. g., hose 131, 231, 331 of FIG. 1, FIG. 2, or FIG. 3) with probe 421.

The parachute-type mechanism or the emergency canopy may be connected to inlet region 460a with connection means such as a latch mechanism, straps, etc. The connection means may prevent the parachute-type mechanism or the emergency canopy from an accidental release. In case of a failure of the thrust producing device to which funnel 460 is attached (e.g., thrust producing device 140, 240, 340 of FIG. 1, FIG. 2 or FIG. 3), the connection means may release the parachute-type mechanism or the emergency canopy.

The connection means may be adapted to release the parachute-type mechanism or the emergency canopy when a load caused by a drag on the parachute-type mechanism or the emergency canopy exceeds a predetermined threshold.

In some embodiments, the parachute-type mechanism or the emergency canopy may be deployed in response to a failure of the thrust producing device (e.g., thrust producing device 140, 240, 340 of FIG. 1, FIG. 2 or FIG. 3). For example, the parachute-type mechanism or the emergency canopy may be released from inlet region 460a with a manually activated release system such as a three-ring release system. If desired, the parachute-type mechanism or the emergency canopy may be released from inlet region 460a with an automatic release system such as a heat-activated release system or a water-activated release system.

In a deployed position, emergency stabilizing device 461 and end 431b of the hose (e.g., hose 131, 231, 331 of FIG. 1, FIG. 2 or FIG. 3) may experience oscillatory vibrations in response to applied forces (e.g., caused by wind). In some cases, end 431b of the hose may begin to oscillate uncontrollably (e.g., at a resonance frequency) with respect to the transmitting entity (e.g., transmitting entity 110, 210 of FIG. 1 or FIG. 2). Emergency stabilizing device 461 may stabilize the hose with respect to the transmitting entity.

More particularly, emergency stabilizing device 461 may take up an excess slack in the hose in order to dampen the oscillation of the hose. Since emergency stabilizing device 461 stabilizes end 431b of the hose, the receiving vehicle may reposition itself relative to end 431b and emergency stabilizing device 461 may be attached to probe 421.

Figure 5:
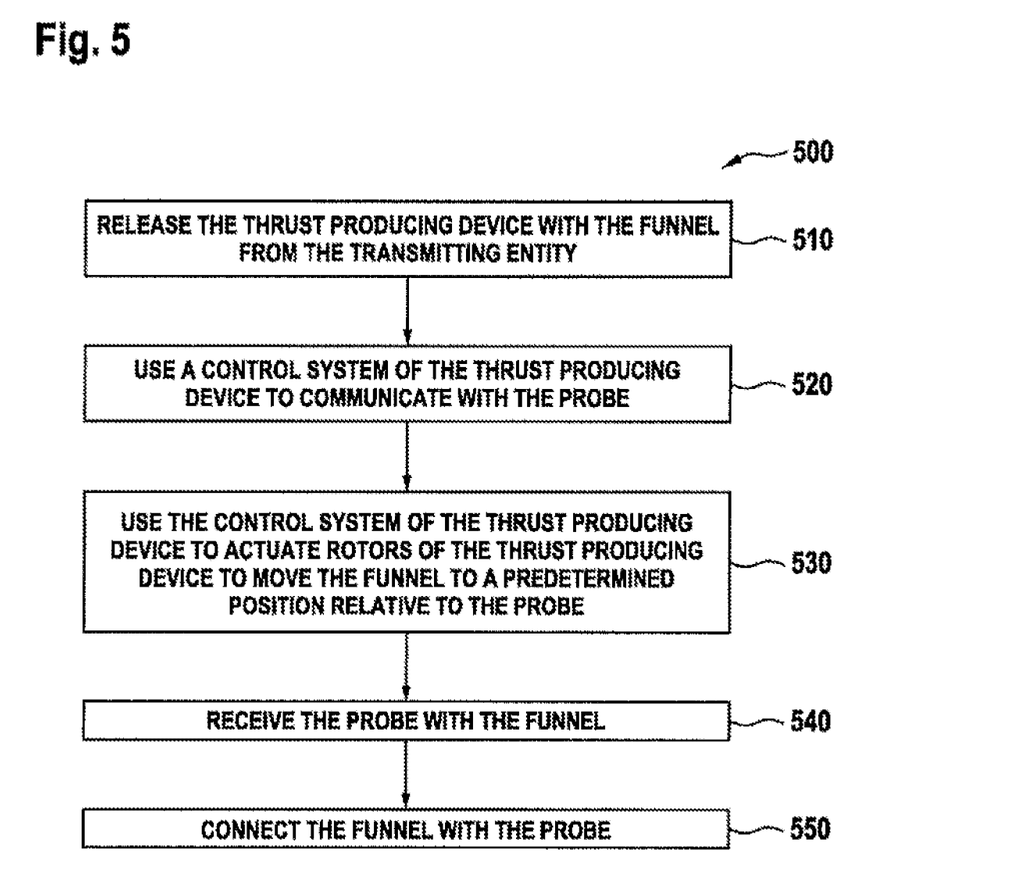
FIG. 5 is a flowchart showing illustrative operations for operating an en route fluid transmitting apparatus in accordance with some embodiments.

FIG. 5 is a flowchart 500 showing illustrative operations for operating an en route fluid transmitting apparatus that is adapted to transmit a fluid from a transmitting entity (e.g., transmitting entity 110, 210 of FIGS. 1 and 2) to a probe (e.g., probe 121, 221 of FIGS. 1 and 2) of a receiving vehicle (e.g., receiving vehicle 120, 220 of FIGS. 1 and 2), such as en route fluid transmitting apparatus 130, 230 of FIGS. 1 and 2 in accordance with some embodiments. If desired, the en route fluid transmitting apparatus may include a funnel, a hose, and a thrust producing device.

During operation 510, the en route fluid transmitting apparatus may release the thrust producing device with the funnel from the transmitting entity. For example, en route fluid transmitting apparatus 130, 230 of FIGS. 1 to 2 may release thrust producing device 140, 240 with funnel 160, 260 from transmitting entity 110, 210.

During operation 520, the en route fluid transmitting apparatus may use a control system of the thrust producing device to communicate with the probe. For example, en route fluid transmitting apparatus 130 of FIG. 1 may use control system 142 of thrust producing device 140 to communicate with probe 121.

During operation 530, the en route fluid transmitting apparatus may use the control system of the thrust producing device to actuate rotors of the thrust producing device to move the funnel to a predetermined position relative to the probe. For example, en route fluid transmitting apparatus 130 of FIG. 1 may use control system 142 of thrust producing device 140 to actuate rotors 150 that move funnel 160 into a predetermined position relative to probe 121.

During operation 540, the en route fluid transmitting apparatus may receive the probe with the funnel. For example, en route fluid transmitting apparatus 130 of FIG. 1 may receive probe 121 with funnel 160.

During operation 550, the en route fluid transmitting apparatus may connect the funnel with the probe. For example, en route fluid transmitting apparatus 130 of FIG. 1 may connect funnel 160 with probe 121.

It should be noted that the above-described embodiments are merely described for illustration purposes, but not in order to restrict the present invention thereto. Instead, multiple modifications and variations of the presented embodiments are possible and should, therefore, also be considered as being part of the invention.

For example, en route fluid transmitting apparatus 130, 230 of FIGS. 1 and 2 is shown with one thrust producing device 140, 240 that includes four rotors 150, 250. However, en route fluid transmitting apparatus 130, 230 of FIGS. 1 and 2 may have any number of thrust producing devices 140, 240 that include any number of rotors 150, 250. For example, en route fluid transmitting apparatus 130, 230 of FIGS. 1 and 2 may have two thrust producing devices 140, 240 that each include two rotors 150, 250. As another example, one of the two thrust producing devices 140, 240 may include two rotors. As yet another example, one of two thrust producing devices 140, 240 may include three rotors, and so on.

As another example, thrust producing device 240 of FIG. 2 is shown with four air ducts 243 that each accommodate one rotor 250. However, thrust producing device 240 of FIG. 2 may include any number of air ducts 243 with any number of rotors 250. For example, thrust producing device 240 of FIG. 2 may include three air ducts 243 that each include two parallelly arranged rotors 250, or five air ducts 243 that each include five parallelly arranged rotors 250, etc.

Moreover, if desired, thrust producing device 140, 240, 340 of FIGS. 1 to 3 may be attached to any number of funnels 160, 260, 360, and any number of hoses 131, 231, 331.

REFERENCE LIST 110 transmitting entity
111 boom
120 receiving vehicle
121 probe
130 en route fluid transmitting apparatus
131 hose
121a, 131b end
140 thrust producing device
141 main body
142 control system
143 air duct
150 rotor
151 rotor hub
152 rotor blade
160 funnel
161 emergency stabilizing device
210 transmitting entity
220 receiving vehicle
221 probe
230 en route fluid transmitting apparatus
231 hose
231a, 231b end
240 thrust producing device
241 main body
243 air duct
250 rotor
260 funnel
330 en route fluid transmitting apparatus
331 hose
331a, 331b end
340 thrust producing device
341 main foody
342 control system
343 air duct
350 rotor
351 rotor hub
352 rotor blade
360 funnel
421 probe
431b end
460 funnel
460a inlet region
461 emergency stabilizing device
500 flowchart
510, 520, 530, 540, 550 operation

What is claimed is:

1. An en route fluid transmitting apparatus for transmitting a fluid from a transmitting entity to a probe of a receiving vehicle, comprising:
   a funnel that is adapted to engage with the probe;
   a hose, comprising:
      a first end that is attached to the transmitting entity, and
      a second end, that is attached to the funnel, wherein the hose is adapted to convey the fluid from the transmitting entity to the funnel; and
   a thrust producing device, comprising
      a main body that is rigidly attached to the funnel, and
      at least two rotors that are disposed within the main body for producing thrust,
   wherein the thrust producing device is adapted to move the funnel freely in any direction to a predetermined position relative to the probe where the funnel engages with the probe.

2. The en route fluid transmitting apparatus of claim 1, wherein the thrust producing device further comprises:
   a control system that is adapted to communicate with the probe and direct the thrust producing device to move the funnel to the predetermined position relative to the probe.

3. The en route fluid transmitting apparatus of claim 2, wherein the control system is adapted to control the thrust producing device to maintain the funnel in the predetermined position relative to the probe for a predetermined period of time.

4. The en route fluid transmitting apparatus of claim 2, wherein the control system further comprises:
 a machine vision device that is adapted to identify a trajectory from a current position of the funnel to the predetermined position relative to the probe.

5. The en route fluid transmitting apparatus of claim 2, wherein the control system further comprises:
 a signal receiving component that is adapted to receive commands from a remote control.

6. The en route fluid transmitting apparatus of claim 1, wherein the funnel further comprises:
 an emergency stabilizing device that is adapted to stabilize the hose in the air.

7. The en route fluid transmitting apparatus of claim 6, wherein the emergency stabilizing device is adapted to be deployed in response to a failure of the thrust producing device.

8. The en route fluid transmitting apparatus of claim 1, further comprising:
 at least two air ducts that each accommodate one of the at least two rotors, wherein the at least two air ducts with the at least two rotors are configured to provide a thrust in direction to the predetermined position relative to the probe.

9. The en route fluid transmitting apparatus of claim 1, wherein the thrust producing device is adapted to be controlled independently of gravity and airstream.

10. The en route fluid transmitting apparatus of claim 1, wherein each of the at least two rotors further comprises:
 a rotor hub; and
 at least two rotor blades that are attached to the rotor hub.

11. The en route fluid transmitting apparatus of claim 10, wherein the thrust producing device further comprises:
 an electric motor that is adapted to drive the at least two rotor blades via the rotor hub; and
 a battery that is located in the main body of the thrust producing device and that is adapted to supply electricity to the electric motor.

12. The en route fluid transmitting apparatus of claim 10, wherein the thrust producing device further comprises:
 an electric motor that is adapted to drive the at least two rotor blades via the rotor hub; and
 a power harness that is coupled to the hose and is adapted to connect a power source onboard the transmitting entity with the electric motor.

13. The en route fluid transmitting apparatus of claim 1, wherein the at least two rotors is adapted to generate a velocity that is greater than a velocity of the transmitting entity.

14. The en route fluid transmitting apparatus of claim 1, wherein the transmitting entity comprises at least one of a mobile entity or an immobile entity, wherein the immobile entity comprises at least one of a land-based construction, and the mobile entity comprises at least one of a land vehicle, a watercraft, a floating platform, or an aircraft.

15. A method for operating an en route fluid transmitting apparatus that is adapted to transmit a fluid from a transmitting entity to a probe of a receiving vehicle, wherein the en route fluid transmitting apparatus comprises a funnel, a hose, and a thrust producing device having at least two rotors disposed within a main body, comprising:
 releasing the thrust producing device with the funnel from the transmitting entity;
 using a control system of the thrust producing device to communicate with the probe;
 using the control system of the thrust producing device to actuate the rotors of the thrust producing device to move the funnel to a predetermined position relative to the probe;
 receiving the probe with the funnel; and
 connecting the funnel with the probe.

* * * * *